United States Patent
Väisänen

(10) Patent No.: US 6,929,278 B2
(45) Date of Patent: Aug. 16, 2005

(54) ADJUSTABLE STEERING COLUMN

(75) Inventor: Esa Väisänen, Rovaniemi (FI)

(73) Assignee: Bombardier-Nordtrac Oy, Rovaniemi (FI)

( * ) Notice: Subject to any disclaimer, the term of this patent is extended or adjusted under 35 U.S.C. 154(b) by 0 days.

(21) Appl. No.: 10/404,650

(22) Filed: Apr. 2, 2003

(65) Prior Publication Data

US 2003/0188596 A1 Oct. 9, 2003

Related U.S. Application Data

(60) Provisional application No. 60/369,601, filed on Apr. 4, 2002.

(51) Int. Cl.⁷ .................................................. B62K 1/00
(52) U.S. Cl. ....................... 280/279; 74/551.3; 180/190
(58) Field of Search ................................. 280/775, 779, 280/276, 279; 180/190; 74/551.1, 551.3, 551.6, 551.7

(56) References Cited

U.S. PATENT DOCUMENTS

| | | | | |
|---|---|---|---|---|
| 643,647 A | * | 2/1900 | Harmon .................... | 280/233 |
| 4,688,817 A | * | 8/1987 | Marier ...................... | 280/278 |
| 4,896,559 A | * | 1/1990 | Marier et al. ............. | 74/551.4 |
| 5,465,634 A | * | 11/1995 | Chen ........................ | 74/551.3 |
| 5,467,665 A | * | 11/1995 | Huang ...................... | 74/551.2 |
| 6,019,054 A | * | 2/2000 | Hattori et al. ............ | 114/55.57 |
| 6,206,395 B1 | * | 3/2001 | Young ....................... | 280/278 |
| 6,276,291 B1 | * | 8/2001 | Lapointe et al. ......... | 114/144 R |
| 6,467,787 B1 | * | 10/2002 | Marsh ....................... | 280/279 |

FOREIGN PATENT DOCUMENTS

DE          3626477 C1  * 10/1987   ........... B62K/21/16

* cited by examiner

Primary Examiner—Daniel G. DePumpo
(74) Attorney, Agent, or Firm—BRP Legal Services

(57) ABSTRACT

An adjustable steering column comprises a steering column shaft, a handlebar, and an adjustable clamp assembly securing the handlebar to the steering column shaft. The adjustable clamp assembly comprises a handlebar clamp to secure the handlebar to the adjustable clamp assembly. An extension is secured to the handlebar clamp and extends away from the handlebar clamp. The extension has first and second opposing sides. A first clamp surface is attached to the steering column. The first clamp surface is disposed on the first side of the extension. A second clamp surface is disposed on a second side of the vertical extension. The second clamp surface is moveable with respect to the first clamp surface from a first position where the extension is immovable to a second position where the extension is moveable.

16 Claims, 4 Drawing Sheets

ADJUSTABLE STEERING COLUMN

CROSS REFERENCE TO RELATED APPLICATION

This application is related to and claims priority to U.S. Provisional Patent Application Ser. No. 60/369,601, which was filed on Apr. 4, 2002. The entirety of the subject matter of that application is incorporated by reference herein.

FIELD OF THE INVENTION

The present invention relates to vehicles that include a steering column. More specifically, the present invention concerns an adjustable steering column for a recreational vehicle. In particular, the present invention concerns an adjustable steering column for a snowmobile.

BACKGROUND OF THE INVENTION

Vehicles such as snowmobiles and all terrain vehicles use a handlebar to steer the vehicle. The handlebar is typically attached to a steering column through a clamp. The clamp used in these steering columns allows the vehicle user to adjust the rotational position of the handlebar with respect to the steering column, but does not allow for other adjustments to be made to the position of the handlebar. The rotational position of the handlebar effects the comfort of the vehicle user's arms, wrists, and hands, but has little effect on the reach, which defines the distance separating the seated user from the handlebar. If a vehicle user desires to adjust the reach, the vehicle user is limited to replacing the handlebar with a different model where the hand positions are further or closer to the vehicle user. Since this option is not economically feasible for every rider, many riders are forced into a riding position that may not be comfortable.

A need, therefore, has developed for a steering column that allows adjustments to be made to the position of the handlebar with respect to the rider without requiring the replacement of the handlebar.

SUMMARY OF THE INVENTION

It is, therefore, an object of the present invention to provide an adjustable steering column that allows adjustments to be made to the position of the handlebar with respect to the vehicle rider without requiring the replacement of the handlebar.

It is another object of the present invention to provide an adjustable steering column that allows adjustments to be easily and quickly made to the position of the handlebar.

In furtherance of these objects, one aspect of the present invention is to provide an adjustable steering column comprising a steering column shaft, a handlebar, and an adjustable clamp assembly securing the handlebar to the steering column shaft. The adjustable clamp assembly comprises a handlebar clamp operatively arranged to secure the handlebar to the adjustable clamp assembly. An extension is secured to the handlebar clamp and extends away from the handlebar clamp in a generally transverse direction with respect to the handlebar. The extension has first and second opposing sides. A first clamp surface is attached to the steering column. The first clamp surface is disposed on the first side of the extension. A second clamp surface is disposed on a second side of the vertical extension. The second clamp surface is moveable with respect to the first clamp surface from at least a first position where the extension is immovable with regard to the first and second clamp surfaces to a second position where the extension is moveable with regard to the first and second clamp surfaces.

Other objects of the present invention will be made more apparent from the discussion that follows.

BRIEF DESCRIPTION OF THE DRAWINGS

Reference will be made hereinafter to the accompanying drawings, which illustrate several embodiments of the present invention discussed herein below, wherein.

DETAILED DESCRIPTION OF THE PREFERRED EMBODIMENTS OF THE PRESENT INVENTION

Figure 1:
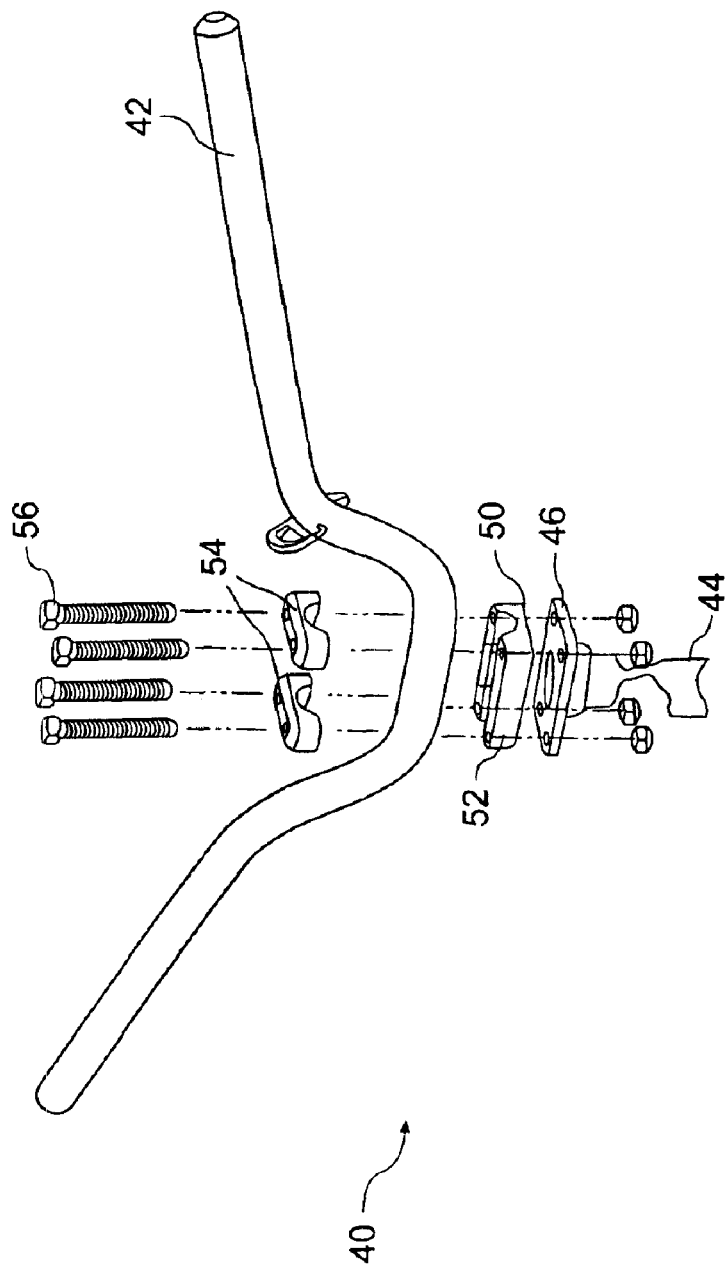
FIG. 1 is an exploded perspective view of a prior art steering column and handlebar assembly.

FIG. 1 shows a prior art steering column and handlebar assembly 40 in an exploded view. The steering column and handlebar assembly 40 comprises a handlebar 42, a steering column shaft 44, a steering column plate 46 disposed at an upper portion of the steering column shaft 44, and a handlebar clamp assembly 50, which comprises a lower clamp block 52, two upper clamp blocks 54 and fasteners 56. The prior art steering column and handlebar assembly 40 only provides rotational adjustment of the position of the handlebar 42 with respect to the steering column shaft 44. Rotational adjustments can be made by loosening the fasteners 56 and rotating the handlebar 42 within the clamp assembly 50.

Figure 2:
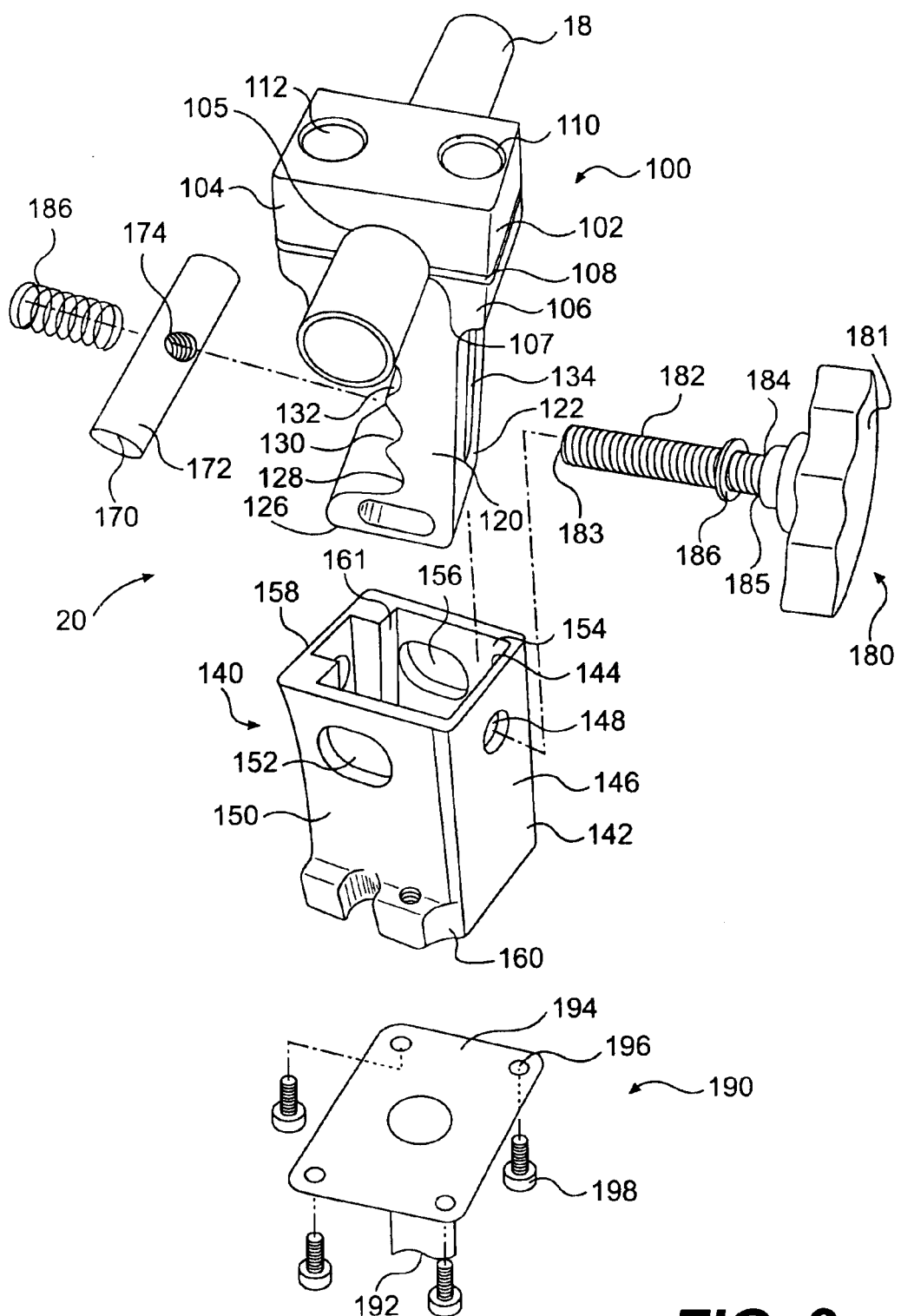
FIG. 2 is an exploded perspective view of the adjustable steering column of the present invention.
Figure 3:
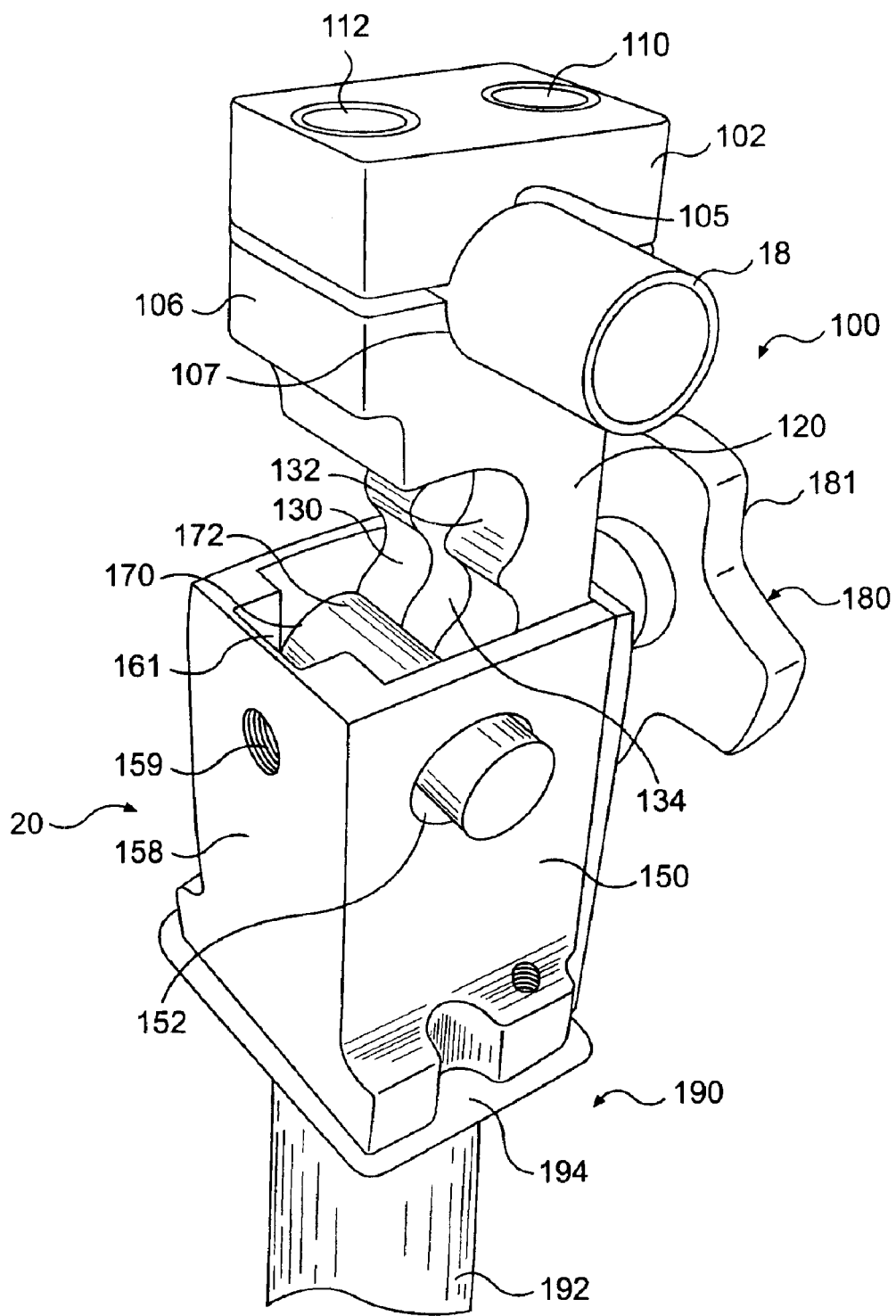
FIG. 3 is a perspective view of the adjustable steering column of the present invention shown in FIG. 2, showing the adjustable steering column in an assembled condition.

FIG. 2 is an exploded view of one embodiment of the present invention, showing a steering column 20 comprising an adjustable clamp assembly 100, which secures the handlebar 18 to a steering column shaft assembly 190. FIG. 3 shows the adjustable clamp assembly 100 in an assembled form.

In greater detail, FIG. 2 shows the adjustable clamp assembly 100, which comprises a handlebar clamp 102. The handlebar clamp 102 is operatively arranged to secure the handlebar 18 to the adjustable clamp assembly 100. The handlebar clamp 102 comprises a top clamp jaw 104 having a recess 105 for mating with the top exterior surface of the handlebar 18, and a bottom clamp jaw 106 having a recess 107 for mating with the bottom exterior surface of the handlebar 18. In the embodiment shown in FIGS. 2 and 3, the handlebar 18 is shown with a cylindrical cross-section. The recesses 105 and 107 within the clamp jaws 104 and 106 have a semi-cylindrical shape to correspond to the handlebar 18. However, as would be apparent to one skilled in the art, the handlebar 18 could have any cross-sectional shape, and the handlebar clamp 102 would be configured to correspond to the shape of the handlebar 18. Although not shown, it would also be apparent to one skilled in the art that the handlebar 18 and handlebar clamp 102 could be manufactured together into an integrated single element.

An extension 120 is secured to the handlebar clamp 102 and extends away from the handlebar clamp 102 in a generally transverse direction with respect to the handlebar 18. As is shown for the embodiment illustrated in FIG. 2, the extension 120 and the clamp jaw 106 are integrated into a single element. However, as would be apparent to one skilled in the art, the extension 120 could also be manufactured separately from the handlebar clamp 102 and subsequently coupled to it.

The extension 120 has a first side 122 and an opposing second side 126. The first side 122 in this embodiment of the invention is generally planar. The second side 126 includes a plurality of vertically-spaced detents 128, 130, and 132. The detents 128, 130, and 132 are transversely disposed on the extension 120 and are generally oriented in a parallel relation with the handlebar 18. The detents 128, 130, and 132 preferably are concave in shape. Detent 128 is disposed the furthest from the handlebar 18, detent 132 is disposed the closest to the handlebar 18, and detent 130 is disposed intermediate to detents 128 and 132. A longitudinal slot 134 extends through the extension 120.

An enclosure 140 is positioned beneath the handlebar 18. The enclosure 140 includes a first wall 142 having an interior surface 144 and an exterior surface 146. A hole 148 extends through the wall 142. A second wall 150 and a third wall 154 are attached to the first wall 142. The second wall 150 includes a longitudinally disposed slot 152. The third wall 154 includes a longitudinally disposed slot 156 disposed opposite to the slot 152. A fourth wall 158 is attached between the second and third walls 150, 154. A base 160 is disposed at the bottom of the enclosure.

A recess 161 is defined by the walls 142, 150, 154, and 158 within the enclosure 140. The recess 161 is T-shaped and is sized and configured so that the extension 120 may be disposed within a portion of it. Accordingly, the interior surface 144 of the first wall 140 is planar so as to conform with the extension first side 122 which abuts the interior surface 144 when the extension 120 is disposed within the recess 161.

Although the enclosure 140 is shown having a rectangular cross-section and a T-shaped recess 161, it would be apparent to one skilled in the art to have manufactured the enclosure with any suitable exterior shape. For example, the enclosure 140 could be made with a circular cross-section, and the extension 120 could be made to fit within a recess within the enclosure that also has a circular cross-section.

A cylinder 170 is disposed within the enclosure 140. The cylinder 170 is sized and configured to fit within one of the detents 128, 130, and 132 in an interlocking arrangement. A portion of the exterior surface 172 of the cylinder 170 abuts the particular detent 128, 130, or 132 within which it is disposed. The cylinder 170 is also sized and configured to be disposed within the opposing slots 152, 156. The cylinder 170 includes a threaded bore 174, which is sized to accommodate the threaded shaft first end 183.

A manually adjustable handle 180 is provided to actuate movement of the cylinder 170. The handle 180 includes a handle portion 181 and a threaded shaft 182 extending from the handle portion 181. With respect to the handle portion 181, the threaded shaft 182 includes a distal end 183 and a proximal end 184. A locking washer 186 is disposed on the threaded shaft 182 proximate to a shoulder on the handle portion 181. The threaded shaft 182 is sized so as to be extend through the hole 148 within the first wall 142 and through the longitudinal slot 134 within the extension 120 before being threadedly disposed with the threaded bore 174 within the cylinder 170. A spring 186 is provided to abut the cylinder 170 opposite the threaded shaft 182.

In addition to the adjustable clamp assembly 100, the steering column 20 includes a steering column shaft assembly 190. The steering column shaft assembly 190 is provided to support the enclosure 140 in an elevated position with respect to the steering column shaft assembly 190. The steering column shaft assembly 190 includes a column shaft 192 and a mounting plate 194. A series of fastener openings 196 are disposed within the mounting plate 194. Fasteners 198 are shown for extending through the mounting plate 194 into the enclosure 140 to secure the enclosure 140 thereto. As would be apparent to one skilled in the art, the enclosure 140 could be attached to the column shaft 192 directly through the use of a clamp, through direct welding of the enclosure 140 to the column shaft 192 or to the mounting plate 194, or through the use of an adhesive. Alternatively, as would be apparent to one skilled in the art, the enclosure 140 could be manufactured as a part of the column shaft 192. This could have been achieved though the use of a steering column having a rectangular cross-section, or having a round cross-section, as is shown in FIG. 2.

FIG. 3 shows the steering column 20 in an assembled condition. In this condition, the extension 120 is clamped between a first clamp surface, which is the interior surface 144 of the enclosure first wall 142, and a second clamp surface, which is a portion of the exterior surface 172 of the cylinder 170. The first clamp surface (the interior surface 144) is rigidly coupled to the steering column 192 when the enclosure 140 is secured to the steering column 192, and thus does not move. Accordingly, the first clamp surface (the interior surface 144) is the immovable jaw of the clamp. The second clamp surface (the cylinder exterior surface 172) is moveable. As shown, the second clamp surface moves with respect to the first clamp surface (the interior surface 144) from at least a first position where the extension 120 is immovable with regard to the first and second clamp surfaces 144, 172 to a second position where the extension is moveable with regard to the first and second clamp surfaces 144, 172.

The handle 180 is an actuator mechanism, which is operatively arranged to actuate movement of the second clamp surface 172 with respect to the first clamp surface 144. Generally, the actuator (handle 180) comprises a threaded shaft 182 having a first end 183 coupled to the second clamp surface 172 and a second end 184 that extends to the exterior of the wall 142. The shaft 182 is disposed for movement relative to the extension 120. The second clamp surface 172 is disposed for movement in a direction parallel to a longitudinal axis of the shaft 182. The threaded shaft 182 is operatively arranged for rotational movement with respect to the second clamp surface 172. The second clamp surface 172 is disposed for movement in a direction parallel to a longitudinal axis of the threaded shaft 182. The threaded shaft second end 184 is positioned proximate to the exterior surface 146 of the wall 142, which is on the opposite side of the wall 142 from the first clamp surface 144 (the interior surface 144 of the wall 142).

The second clamp surface (the cylinder exterior surface 172) is configured to interlock within of the detents 128, 130, 132 disposed within the extension second surface 126. Specifically, the detents 128, 130, 132 are concave and the second clamp surface (the cylinder exterior surface 172) is convex so as to interlock with the concave detents 128, 130, or 132. As is shown in FIG. 2, the cylinder 170 is substantially disposed within the recess 161. Additionally, the cylinder is supported within the slot 152 of the wall 150 and the slot 156 of the wall 154. The cylinder 170 is permitted to move fore and aft within the slots 152 and 156, but is not permitted to move up and down. The fore aft movement of the cylinder 170 is essentially transverse to the extension 120.

As would be apparent to one skilled in the art, there is no absolute necessity for the cylinder 170 to be retained within the slots 152 and 156. However, the slots do maintain the cylinder 170 in a constant vertical position which facilitates the use of the adjustable clamp assembly 100. Additionally, it should also be understood that the walls 150, 154 and 158, which serve to enclose the extension 120 and the cylinder 170 within the enclosure 140, also do not provide a function to the adjustable clamp assembly 100 that is absolutely necessary. Accordingly, these elements could be removed from the adjustable clamp assembly 100, if desired.

In use, the adjustable clamp assembly 100 allows the position of the handlebar 18 to be easily moved with respect to the steering column 190. In particular, the adjustable clamp assembly 100 allows the handlebar 18 to be extended with respect to the steering column 190. In the embodiment of the present invention shown in FIGS. 3 and 4, the adjustable clamp assembly 100 is generally oriented along the axis of the column shaft 192 of the steering column 190 such that the handlebar 18 is transverse to the column shaft 192 and generally moves parallel to the axis of the column shaft 192. However, as would be apparent to one skilled in the art, the adjustable clamp assembly 100 could be oriented with respect to the steering column 190 so that the handlebar 18 moves in a non-parallel direction with respect to the axis of the column shaft 192.

Specifically, the position of the handlebar 18 is adjusted with respect to the steering column 190 by first loosening the handle portion 181 of the handle 180. The loosening of the handle portion 181 loosens the clamp between the cylinder 170 and one of the detents 128, 130, and 132. The clamping force applied by the first clamp surface 144 (the interior surface 144 of the wall 142) and second clamp surface (the cylinder exterior surface 172) on the extension 120 diminishes as the handle portion 180 is loosened. The handle portion 181 is loosened until the extension 120 can be moved upward or downward within the recess 161. When the extension 120 moves upward or downward within the recess 161 the cylinder 170 slips from one of the detents 128, 130, or 132 to another of the detents 128, 130, or 132. The spring 185 urges the cylinder 170 into one of the detents 128, 130, or 132. Upon the re-positioning of the handlebar 18 at the desired position with respect to the steering column 190, the handle portion 181 is tightened, causing a compressive clamping force on the extension 120 as the second clamp surface (the cylinder exterior surface 172) moves toward the first clamp surface 144 (the interior surface 144 of the wall 142). The handle portion 181 is tightened until the lock washer 186 is tightly retained between the exterior surface 146 of the first wall 142 and the shoulder 185, which is disposed on the handle 180. At this point, the handlebar 18 is secured with respect to the steering column 190.

As would be apparent to one skilled in the art, the interlocking function of the cylinder exterior surface 172 (second clamp surface) within the detents 128, 130, and 132 could be accomplished through other structures. For example, the second clamp surface could have a single serration or a series of serrations which would interlock with serrations disposed on the extension second surface 126. As would also be apparent to one skilled in the art, the movement of the cylinder exterior surface 172 (second clamp surface) with respect to the first wall interior surface 144 (first clamp surface) could be accomplished through actuation mechanisms other than the handle 180. For example, an unthreaded shaft having a first end coupled to the cylinder exterior surface 172 (second clamp surface) and a second end disposed outside the wall 142 fitted with a cam lock mechanism could also be used to actuate movement of the cylinder exterior surface 172 (second clamp surface). Similarly, a handle could be disposed outside of the enclosure fourth wall 158, which would push the cylinder exterior surface 172 (second clamp surface) toward the first wall interior surface 144 (first clamp surface). Still other actuation mechanisms are contemplated, to be within the scope of the invention, as would be appreciated by those skilled in the art.

Figure 4:
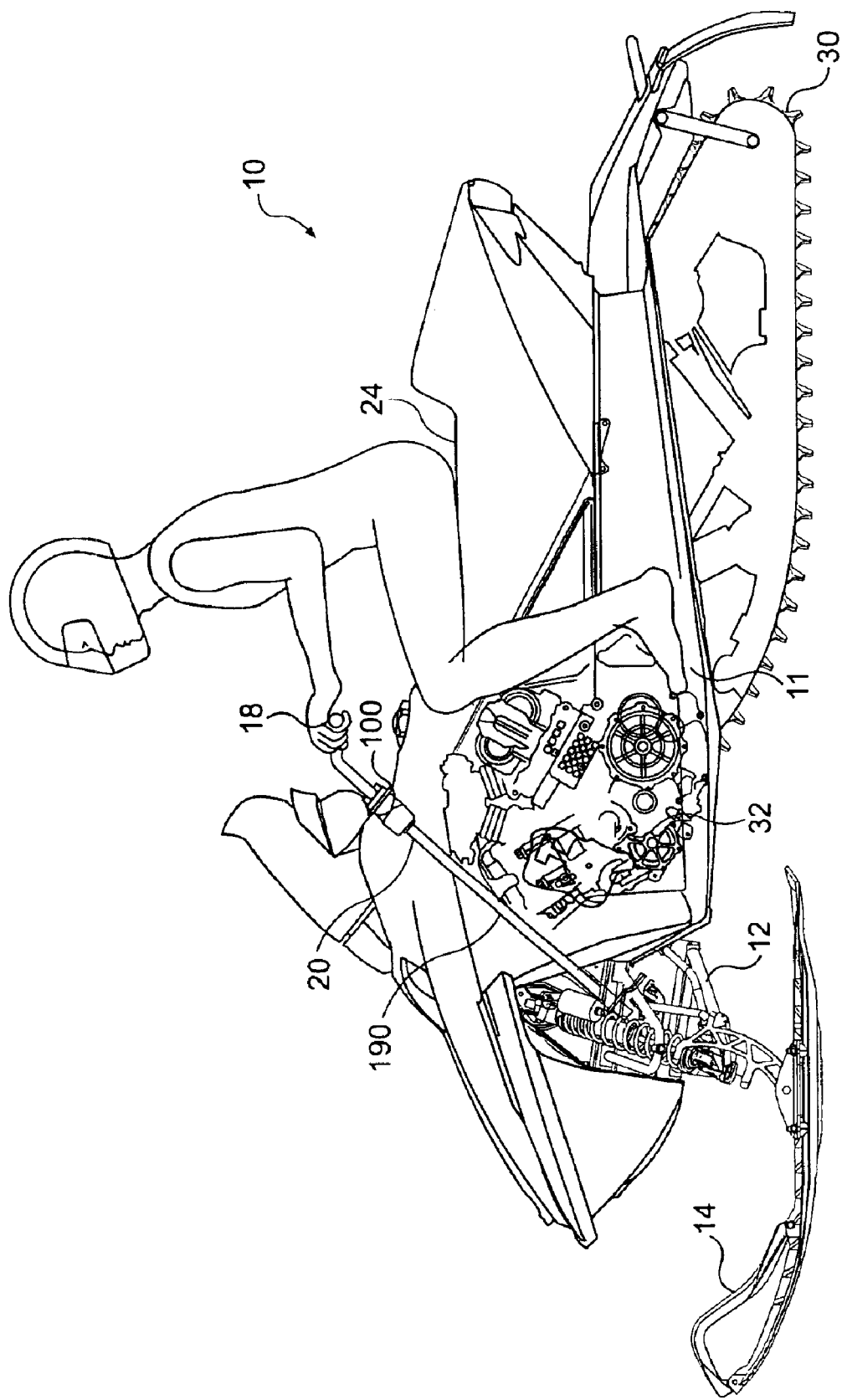
FIG. 4 is a side view of a snowmobile that incorporates the adjustable steering column of the present invention.

FIG. 4 shows a snowmobile 10 having an adjustable steering column 20 according to the invention as shown in FIGS. 2 and 3. In general, the snowmobile 10 includes a chassis 11 around which the various snowmobile components are assembled. The snowmobile has a front suspension system 12 located at a forward portion of the chassis to support the forward portion of the snowmobile 10 on the ground and to provide steering control for the snowmobile 10. The front suspension system 12 includes at least one ski 14 and more typically two skis 14. A steering column 20 couples a handlebar 18 to the skis 14. The steering column comprises a steering column shaft assembly 190, and an adjustable clamp assembly 100 (only partially shown) through which the handlebar 18 is secured to the steering column shaft assembly 190. As is known in the art, the steering column 20 transmits the movement of the handlebar 18 to the skis through a steering system, which, for example, may be a tie rod assembly (not shown) or other mechanical linkage. By turning the handlebar 18, the skis 14 can be pivoted laterally to steer the snowmobile 10. A propulsion system comprising a track 30 is mounted under the chassis 11. The track 30 rotates to propel the snowmobile 10 through the snow. An internal combustion engine 32, located at the forward portion of the chassis 11 is operatively arranged to drive the track 30 through a transmission system, as is known in the art. A cushioned seat 24 is provided on the upper portion of the chassis 11. A snowmobile operator sits on the seat 24 during the operation of the snowmobile 10.

As would be apparent to one skilled in the art, the snowmobile 10 is one of many types of vehicle within which the adjustable steering column 20 of the present invention could be utilized. For example, the adjustable steering column 20 could also be used in an all terrain vehicle (ATV) or a personal watercraft.

While the invention has been described with reference to a preferred embodiment, it will be understood by those skilled in the art that various changes may be made and equivalents may be substituted for elements thereof without departing from the spirit and scope of the present invention. In addition, many modifications may be made to adapt a particular situation, component, or material to the teachings of the present invention without departing from its teachings as claimed.

What is claimed is:

1. An adjustable steering column comprising:
   a steering column shaft;
   a handlebar; and
   an adjustable clamp assembly coupling the handlebar to the steering column shaft, the adjustable clamp assembly comprising
   a handlebar clamp operatively arranged to secure the handlebar to the adjustable clamp assembly;
   an extension secured to the handlebar clamp and extending away from the handlebar clamp, the extension having first and second opposing sides;
   a first clamp surface attached to the steering column, the first clamp surface disposed facing the first side of the extension; and
   a second clamp surface, the second clamp surface disposed facing the second side of the extension, the second clamp surface being moveable with respect to the first clamp surface from at least a first position where the extension is immovable with regard to the first and second clamp surfaces to a second position where the extension is moveable with regard to the first and second clamp surfaces;

the extension second side including a series of vertically spaced apart detents.

2. The adjustable steering column of claim 1, wherein the adjustable clamp assembly further comprises an actuator operatively arranged to actuate movement of the second clamp surface with respect to the first clamp surface.

3. The adjustable steering column of claim 2, wherein the actuator comprises a shaft having a first end coupled to the second clamp surface, the shaft being disposed for movement relative to the extension, the second clamp surface being disposed for movement in a direction parallel to a longitudinal axis of the shaft.

4. The adjustable steering column of claim 2, wherein the actuator comprises a threaded shaft having a first end coupled to the second clamp, the threaded shaft being operatively arranged for rotational movement with respect to the second clamp surface, the second clamp surface being disposed for movement in a direction parallel to a longitudinal axis of the threaded shaft.

5. The adjustable steering column of claim 4, wherein the first clamp surface is disposed on a wall connected to the steering column shaft and a second end of the threaded shaft is disposed on an opposite side of the wall from the first clamp surface.

6. The adjustable steering column of claim 5, wherein a manually adjustable handle is disposed on the threaded shaft second end.

7. The adjustable steering column of claim 1, wherein the second clamp surface is configured to interlock with the vertically spaced apart detents of the extension second surface.

8. The adjustable steering column of claim 7, wherein:

the detents are concave; and the second clamp surface is convex so as to interlock with the concave detents.

9. The adjustable steering column of claim 8, wherein the second clamp surface is a portion of an exterior surface of a cylinder.

10. The adjustable steering column of claim 1, wherein:

wherein the first clamp surface is disposed on a wall, the wall comprising part of a peripheral wall of an enclosure, the enclosure comprising a recess therein; and the extension is disposed within the recess.

11. The adjustable steering column of claim 10, wherein the enclosure includes four walls disposed in a rectangular shape.

12. The adjustable steering column of claim 10, wherein the second clamp surface is substantially disposed within the recess.

13. The adjustable steering column of claim 12, wherein the second clamp is supported by the enclosure.

14. The adjustable steering column of claim 10, wherein the enclosure includes a base configured for mating attachment with the steering column.

15. A snowmobile comprising:

a chassis;

a track movably mounted on the chassis;

an engine supported on the chassis, the engine operatively arranged to drive the track;

at least one ski mounted at a forward portion of said chassis to provide steering control of the snowmobile;

the adjustable steering column of claim 1, wherein the steering column shaft is coupled to the at least one ski.

16. A vehicle comprising:

a chassis;

a propulsion system movably mounted on the chassis;

an engine supported on the chassis, the engine operatively arranged to drive the propulsion system;

a steering system to provide steering control to the vehicle;

the adjustable steering column of claim 1, wherein the steering column shaft is coupled to the steering system.

* * * * *